May 31, 1938. H. L. McQUISTON 2,119,084
AUTOMATICALLY AND MANUALLY OPERABLE VALVE
Filed June 7, 1934 2 Sheets-Sheet 1
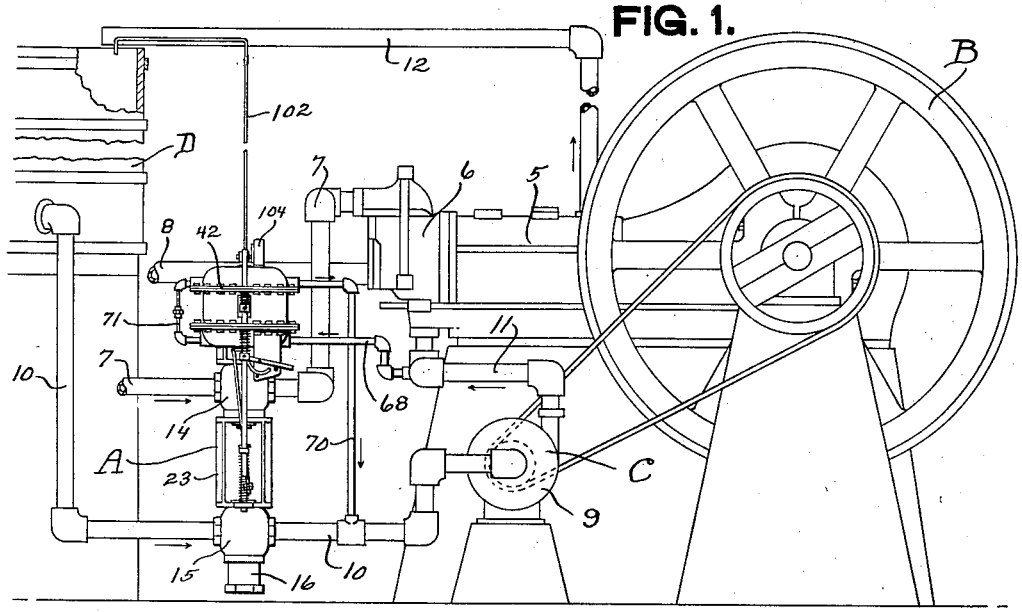
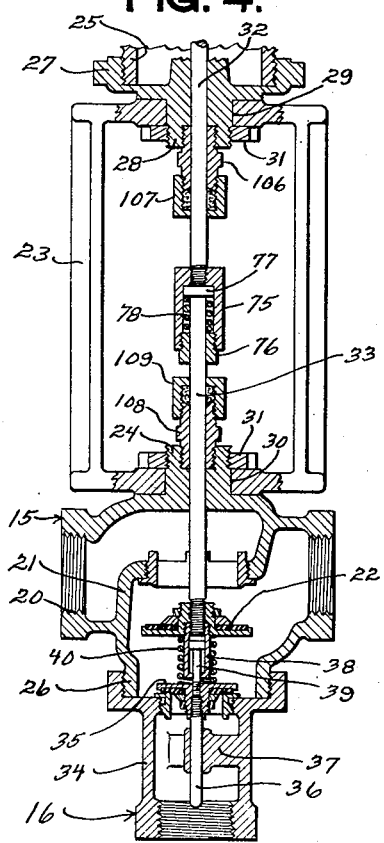
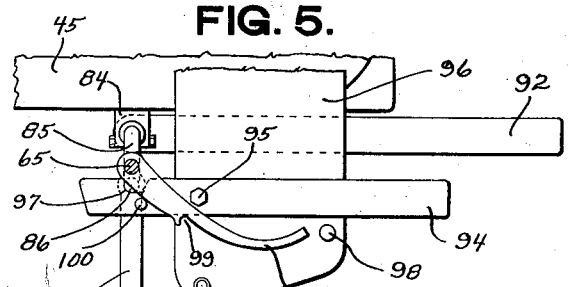
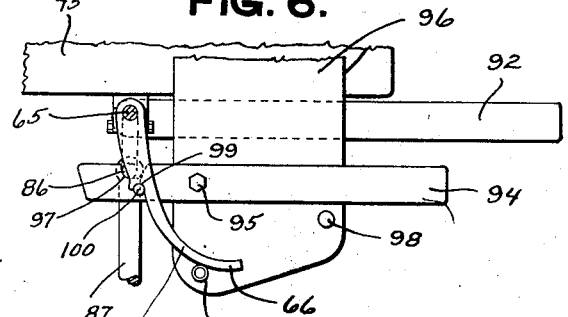
INVENTOR.
Horace L. McQuiston.
BY Lancaster, Allwine & Rommel
ATTORNEYS.

May 31, 1938.  H. L. McQUISTON  2,119,084
AUTOMATICALLY AND MANUALLY OPERABLE VALVE
Filed June 7, 1934  2 Sheets-Sheet 2
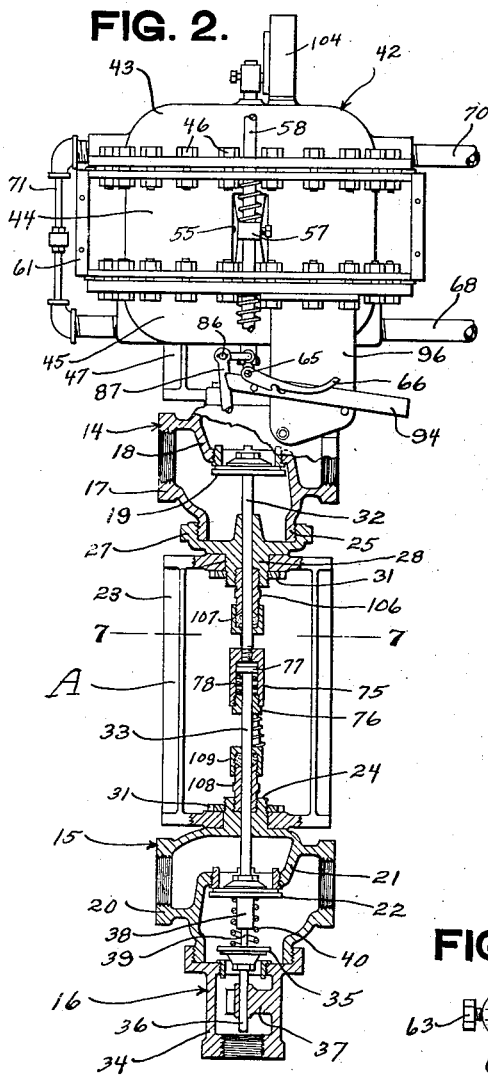
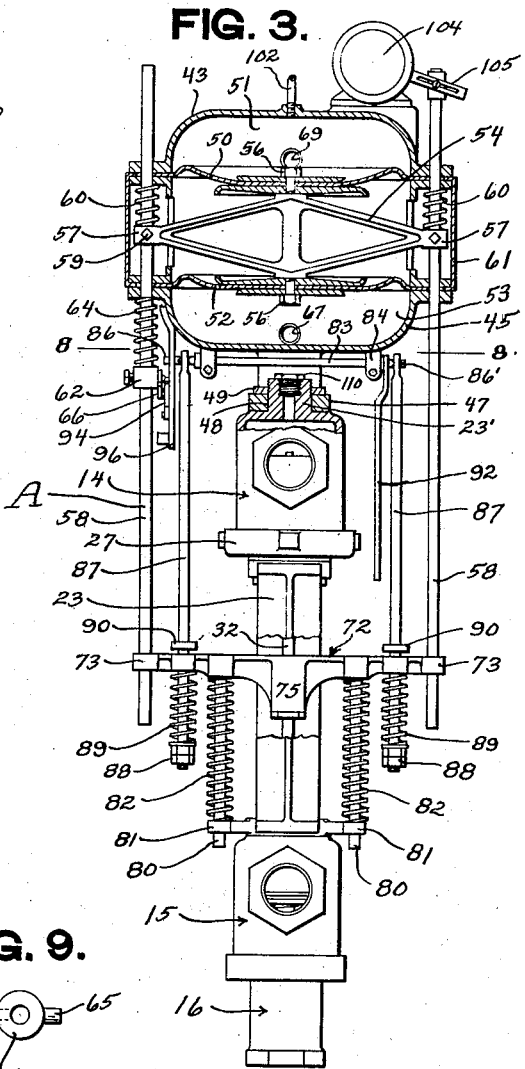
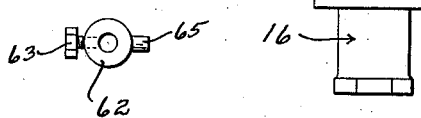
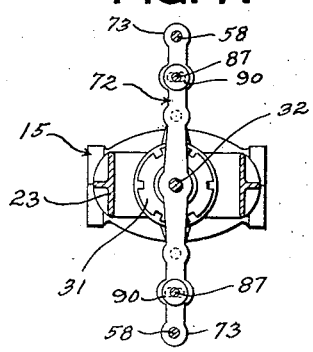
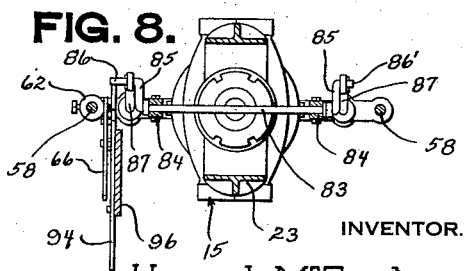
INVENTOR.
Horace L. McQuiston.
BY Lancaster, Allwine and Rommel
ATTORNEYS.

Patented May 31, 1938

2,119,084

UNITED STATES PATENT OFFICE 2,119,084

AUTOMATICALLY AND MANUALLY OPERABLE VALVE

Horace L. McQuiston, Oklahoma City, Okla., assignor to Phillips Petroleum Company, a corporation of Delaware Application June 7, 1934, Serial No. 729,495

7 Claims. (Cl. 137—153)

The present invention relates to improvements in control valves such as disclosed in Patent #1,932,704, granted to me on October 31, 1933 and the primary object of the present invention is to provide a control device for engines which is manually set to permit operation of the engine and automatically released to shut off the fuel supply to the engine and drain the cooling water from the engine in case of pressure failure in the water cooling system for the engine or shutting down of the engine for any reason.

A further and important object of the present invention is to provide an automatically and manually operable control device of this character wherein a great number of the parts are alike and interchangeable, thereby reducing manufacturing costs and also simplifying the stocking of replacement parts.

A further object of the invention is to provide a manually set, diaphragm operated control valve means adapted to be associated with the fuel supply line and the circulating water cooling line of gas engines to prevent escape of gas upon failure in operation of the engine; to stop the flow of the cooling water and automatically drain the engine jacket, circulating pump and piping system on the discharge side of the control device upon failure in operation of the engine; to automatically shut off the fuel supply to the engine upon pressure failure in the water cooling system; to automatically ground the ignition circuit to the engine when the engine exceeds its normal running speed, and upon such shutting down of the engine shut off the fuel supply and drain the cooling system.

A still further object resides in the novel arrangement for connecting the control valves in a shunted relation to the water circulating system so that both a pressure and a suction acts jointly to operate the valve.

Other objects and advantages of the invention will be apparent during the course of the following detailed description, taken in connection with the accompanying drawings forming a part of this specification and in which drawings:—

Figure 1 is a view showing the control device associated with a gas engine and its cooling system in a manner to automatically control the fuel supply and flow of cooling water and allow for draining of the water from the engine upon failure in engine operation, the valve being shown with the parts in position when the engine is idle.

Figure 2 is an enlarged view part in vertical section and part in elevation and showing the closed position of the valve with the two stop valves closed and the drain valve open.

Figure 3 is a view part in elevation and part in vertical section, the view being taken at a right angle to that in Figure 2.

Figure 4 is an enlarged vertical section thru the lower portion of the control device showing the lower stop valve open and the drain valve closed.

Figure 5 is an enlarged fragmentary detail view showing the position of the manually operable means when moved to a position for opening the two stop valves and closing the drain valve.

Figure 6 is an enlarged fragmentary detail view showing the position of the valve setting means during the running condition of the engine.

Figure 7 is a transverse section on the line 7—7 of Figure 2.

Figure 8 is a transverse section on the line 8—8 of Figure 3.

Figure 9 is a detail view of the adjustable collar forming a pivot for the tripping pawl for the manually setting means.

In the drawings and wherein similar reference characters designate corresponding parts thruout the several views, the control device A has been shown operatively associated with a gas engine B to serve for automatically shutting off the gas supply upon failure in operation of the engine, controlling flow of the cooling water to the engine and also allow for draining of the water from the engine upon automatic closing of the control device. The control device is so associated with the water cooling system C of the engine so as to control both fuel and water in case of pressure failure in the water cooling system.

The gas engine B is of conventional construction and embodies the cylinder 5 and cylinder head 6 to which is connected a fuel supply pipe or line 7 and the exhaust pipe 8. The cooling system C embodies a forced circulating water pump 9 for circulating the cooling water to the engine and this pump may be belt driven from the engine as shown or operated in any preferred manner. The inlet of the pump 9 is connected by a suction or circulating pipe 10 to the bottom of a supply tank D, while the discharge outlet of the pump is connected to the water jacket of the engine cylinder by the discharge or pressure pipe 11. Connected also with the water jacket of the engine cylinder is a return pipe 12 which discharges into the top of the water supply tank D whereby a constant circulation of water is had thru the engine during operation of the pump.

Referring now to the construction and operation of the control device A, the same embodies an upper or fuel stop valve 14 interposed in the fuel supply pipe 7, a lower or water stop valve 15 interposed in the suction pipe 10, and a drain valve 16 associated with the valve 15 and adapted to be opened upon closing of the valves 14 and 15.

The fuel stop valve 14 embodies a valve body 17 having a partition 18 provided with a seat against the under side of which the valve disc assembly 19 seats for controlling passage of gas to the engine. The lower stop valve 15 embodies a valve body 20 having a partition 21 provided with a seat against the under side of which a valve disc assembly 22 seats for controlling passage of water thru the valve body and to the engine.

These stop valves 14 and 15 are secured in fixed spaced relation one above the other by means of an open substantially rectangular-shaped frame or yoke 23.

The valve bodies 14 and 15 are of like construction, the valve body 14 being provided at its upper side with a combined guide and coupling extension 23' arranged axially above the valve seat in the body, and the lower valve 15 being provided at its upper side and co-axially of its valve seat with a combined guide and coupling extension 24. The lower side of the valve body 17 is provided with an externally threaded sleeve portion 25, while the lower side of the valve body 20 is provided with an externally threaded sleeve portion 26 and these sleeve portions are arranged in axial alignment with the valve seat. Closing the sleeve portion 25 of the valve body 17 is a valve bonnet 27 having an axially disposed coupling extension 28. The upper cross piece of the open coupling frame 23 is provided with a circular opening 29 for receiving the coupling extension 28 of the bonnet 27, while the lower part of the frame is provided with a circular opening 30 for receiving the coupling extension 24 of the lower valve 15. These coupling extensions 24 and 28 are threaded for receiving frame nuts 31 whereby the valves 14 and 15 are secured in vertically spaced relation.

Vertically guided thru the bonnet 27 is an upper or gas valve stem 32 upon the upper end of which the valve disc assembly 19 is mounted. Secured at its lower end to the valve disc assembly 22 and vertically guided in the coupling extension 24 in axial alignment with the valve stem 32, is a lower or water valve stem 33. These valve stems 32 and 33 are connected by a yieldable coupling means to be later described.

The drain valve 16 embodies a substantially tubular body 34 having an internally threaded upper end for threaded connection upon the sleeve portion 26 of the valve 15. The upper end of the tubular body 34 is provided with a valve seat against the upper side of which a valve disc assembly 35 seats. Secured to the lower side of the disc assembly 35 is a drain valve stem 36 guided in a suitable spider 37 formed in the drain valve body.

A yieldable coupling is provided between the valve discs 22 and 35 and this coupling embodies a sleeve 38 secured to and extending downwardly from the disc 22 and in which is guided a link 39 which is secured at its lower end to the valve disc 35. The link 39 is provided with a head in the sleeve 38, and an expansion coil spring 40 encircles the stem and sleeve with one end acting upon the disc 22 and its opposite end acting upon the disc 35 whereby the disc 35 is normally urged to a closed position. When the valve disc 22 closes, the headed end of the link 39 is engaged by the lower end of the sleeve 38 and raises the disc 35 off its seat. This yieldable coupling between the discs 22 and 35 allows for the valve stems 32 and 33 to move downward after the drain valve disc 35 is fully seated.

Secured to and supported upon the upper side of the fuel stop valve 14 is a diaphragm casing 42 embodying an upper diaphragm case 43, a cylindrical center diaphragm case 44 and a lower diaphragm case 45. The casing sections 43, 44 and 45 are provided with peripheral flanges whereby the sections may be clamped together by suitable bolts 46 extended thru these flanges. Preferably formed integral with the lower diaphragm case 45 and extending from the lower side thereof is a substantially U-shaped frame 47 provided with a circular opening 48 as shown in Figure 3 for receiving the coupling extension 23' of the upper valve 14. The coupling extension 23' is threaded for receiving a clamping nut 49 serving to secure the diaphragm casing 42 in axial alignment above the valve 14.

Arranged in the upper portion of the diaphragm casing 42 with its peripheral portion clamped between the flange of the upper diaphragm case 43 and the upper flange of the center diaphragm case 44 is an upper diaphragm 50 co-acting with the casing 43 to form an upper diaphragm chamber 51, while arranged in the lower portion of the diaphragm casing with its peripheral portion clamped between the flange of the lower diaphragm case 45 and the lower flange of the center diaphragm case 44 is a lower diaphragm 52 co-acting with the case 45 to form a lower diaphragm chamber 53. These spaced apart diaphragms 50 and 52 are secured together at their axial portions by the beam 54, the ends of which project thru diametrically arranged openings 55 in the center diaphragm case 44. The diaphragms 50 and 52 are connected to the beam 54 by means of suitable bolts 56. The beam 54 extends diametrically thru the center diaphragm case 44 and is provided at each end, exteriorly of the case, with an eye 57 and each of these eyes receives a slide rod 58 adjustable in the eyes by a bolt 59. These slide rods 58 are vertically reciprocable by the beam 54 when actuated by the diaphragms 50 and 52 and are slidably guided in the peripheral flanges of the diaphragm casing 42 as clearly shown in Figure 3. Encircling each slide rod 58 to act between each beam eye 57 and the upper peripheral flange of the center diaphragm case 44 is a coil spring 60 and these springs yieldably resist upward movement of the beam by the diaphragms. A diametrically divided cover plate 61 preferably encircles the center diaphragm case 44 and provides a protective closure for the diaphragms.

Adjustable along one of the slide rods 58 below the flange of the lower diaphragm case 45 is a collar or sleeve 62 adjustable along the rod by the cap screw 63. Encircling the slide rod above the collar 62 is a coil spring 64 having its upper end acting against the peripheral flange of the lower diaphragm case 45. This adjustable collar or sleeve 62 is shown in detail in Figure 9 and is provided with a radially projecting pivot pin 65 for pivotally receiving a setting lever tripping pawl 66.

Opening into the lower portion of the diaphragm chamber 53 is a port 67 to which is connected one end of a pressure line 68 having its opposite end connected to the discharge or pressure pipe 11. Opening into the lower portion of the upper diaphragm chamber 51 is a suction port 69 to which is connected one end of a suction line 70 having its opposite end connected in the suction pipe 10 between the water valve 15 and the circulating pump 9. An equalizing line 71 provides communication between the diaphragm chambers 51 and 53 and this line 71 as will be observed in Figure 2 is formed of relatively small tubing having a diameter considerably less than the lines 68 and 70. Thus it will be seen that during operation of the circulating pump 9 that a pressure will be created in the lower diaphragm chamber 53 and a suction will be created in the upper diaphragm chamber 51 and so acts upon the diaphragms 50 and 52 as to impart upward movement to the slide rods 58 against the tension of the springs 60 and 64.

Arranged between the upper and lower stop valves 14 and 15 respectively, is a cross bar or beam 72 provided at each end with an eye 73 forming guides for the lower end portions of the slide rods 58. The central portion of the beam 72 is constructed to provide a yieldable coupling between the valve stems 32 and 33 and is formed with a barrel portion 75 and having threaded into its upper end the lower end of the upper or gas valve stem 32. A nut 76 is threaded into the lower end of the barrel portion 75 and reciprocally receives therethru the upper portion of the lower or water valve stem 33. As shown more particularly in Figure 4, the upper end of the valve stem 33 is formed with a head 77 against which one end of a coil spring 78 acts, the opposite end of the spring acting upon the nut 76 so that the head 77 is normally urged against the upper closed end of the barrel 75. This arrangement allows for proper seating of each of the valves 19 and 22 and serves to compensate for any uneven wearing of the disc and seat. Engagement of the head 77 with the upper end of the barrel 75 insures unseating of both of the valve discs 19 and 22 when the valve stems are moved downwardly by a force acting upon the cross beam 72.

Secured at their upper ends to the cross beam 72 and arranged one at each side of the barrel portion 75 are guide pins 80, the lower ends of which are reciprocally guided in arms 81 preferably formed integral with the lower portion of the coupling frame 23. Encircling each of the pins 80 with one end acting upon the beam 72 and their opposite ends acting upon the arms 81 is an expansion coil spring 82. These springs 82 provide valve actuating springs normally exerting an upward force on the beam 72 which in turn exerts an upward force on the valve stems 32 and 33 for normally seating the valves 19 and 22 and unseating the drain valve 35. It will again be noted that the slide rods 58 are slidable in the ends of the cross beam 72 so that no movement is imparted to the slide rods upon movement of the beam.

An arrangement is provided for manually opening the control device and placing the valves in condition for operation of the engine and allow for automatic operation of the control device upon failure in engine operation. This manual control means embodies a crank rod or shaft 83 extended transversely beneath the lower diaphragm case 45 and journaled in suitable bearings 84. Formed at each end of the crank rod 83 is a crank arm 85. The crank arms 85 are provided with crank pins 86 and 86', the crank pin 86 being of slightly greater length than the length of the crank pin 86' as clearly shown in Figure 8. A push rod 87 is connected at its upper end to each of the crank pins 86 and 86' and have their lower ends slidably extended thru the cross beam 72. The lower ends of the push rods 87 are threaded to receive nuts 88, and a shock absorbing coil spring 89 encircles the push rod between the nuts 88 and the beam 72. Each push rod 87 is provided above the beam 72 with a collar or shoulder 90 adapted to engage the beam and force the beam downwardly against the tension of the springs 82 upon rotation of the crank rod 83. Rigidly secured to one end of the crank rod 83 is a valve operating lever 92 arranged with its longitudinal axis at a right angle or at an angle of 90° to the crank arms 85. When the crank arms 85 are in a horizontal position as shown in Figure 2, the operating lever 92 is in a vertical position so that the weight of the operating lever normally retains the crank arms in a horizontal position. When the operating lever 92 is raised to a horizontal position, the crank arms 85 swing downwardly, forcing the push rods 87 downwardly so that the shoulders 90 engage the cross beam 72 and exert a downward pressure on the valve stems 32 and 33 thus opening the valve discs 19 and 22 and seating the valve disc 35.

A releasable latch arrangement is provided for retaining the manually operable means in its valve opening position and setting the valve for automatic operation, and this means embodies a valve setting lever or latch 94 which is intermediately pivoted as at 95 upon a mounting plate 96 suitably bolted to the diaphragm casing 42. The inner shorter end of the valve setting latch 94 is provided in its upper edge with a notch 97 arranged to receive the end portion of the crank pin 86 when swung downwardly by the operating lever 92. When the operating lever 92 is swung upwardly to a horizontal position as shown in Figure 5, the crank pin 86 first engages the nose of the latch 94 and moves along the upper edge of the latch into the notch 97 whereby the operating lever 92 is held in a horizontal position holding the valve discs 19 and 22 open and the valve disc 35 closed. The heavier outer end of the latch 94 normally urges the inner end of the latch upwardly into engagement with the crank pin 86. A pin 98 serves to limit downward swinging movement of the latch 94 at its outer end.

The setting lever tripping pawl 66 is pivotally mounted at one end upon the pivot pin 65 of the collar 62 and has movement imparted thereto by the diaphragms 50 and 52. This tripping pawl 66 is of substantially arcuate shape and is provided on its convex edge with a notch 99 arranged to co-act with a pin 100 carried by the latch 94 inwardly of the pivot 95. A roller 101 on the mounting plate 96 serves to guide the pawl for proper engagement with the pin 100. As will be observed in Figures 5 and 6, the pawl 66 is pendently hung upon the pivot pin 65 and normally swings in a direction toward the inner end of the latch 94, with the convex edge of the pawl normally resting upon the pin 100.

Communicating with the top of the upper diaphragm case 43 is a small vacuum vent line 102 which preferably extends to a point above the water level in the tank D. This small vent line serves to permit escape of air from the diaphragm chamber 51 when being filled and also allows for water to drain out of this chamber by permitting air to enter as the chamber is being drained.

An arrangement is also provided for grounding the ignition circuit of the engine in the event that the load is suddenly removed from the engine so that the engine exceeds its normal running speed. This means embodies an electric switch 104 suitably mounted upon the upper side of the diaphragm casing 42 and having a switch arm 105 connected for operation by one of the slide rods 58. This switch arm 105 acts to open the switch 104 when the slide rods have been moved upwardly beyond a predetermined limit of movement by the diaphragms 50 and 52.

Referring particularly to Figure 4, the lower end of the coupling extension 28 of the bonnet 27 is formed with a threaded socket for receiving a stuffing box 106 upon the lower end of which is threaded a stuffing box nut 107 for sealing against escape of gas past the valve stem 32. The upper end of the coupling extension 24 is formed with a screw threaded socket for receiving a stuffing box 108 upon which is threaded a stuffing box nut 109 serving to prevent escape of water upwardly past the valve stem 33. Since the stop-valves 14 and 15 are preferably of identical construction and interchangeable, the valve stem passageway thru the coupling extension 23' of the stop valve 14 may be sealed by a suitable plug 110 as shown in Figure 3. If so desired, however, the upper valve 14 need not be drilled to provide a valve stem guide and in which event the plug 110 will not be needed.

In operation of the control device for automatically shutting off the supply of fuel to the engine upon failure in operation of the engine, the condition of parts when the engine is idle are such as disclosed in Figures 1, 2 and 3 with the stop valves 14 and 15 closed and the drain valve 16 open. To start the engine, the operator grasps the operating lever 92 and swings the same upwardly to a horizontal position which in turn swings the crank pin 86 downwardly to a position such as shown in Figure 5 where the pin engages in the notch 97 and is held by the valve setting latch 94 with the operating lever 92 held in a horizontal position. This downward swinging of the crank pins 86 and 86' forces the push rods 87 downwardly so that the shoulders 90 thereof engage the cross beam 72 and thus force the valve stems 32 and 33 downwardly against the tension of the valve closing springs 82. Figure 5 shows the position of parts after the valve has been manually opened. The engine may then be started and the pump 9 is operated thereby and causes a forced circulation of water thru the cooling system. Operation of the pump 9 will produce a pressure in the lower diaphragm chamber 53 and a suction in the upper diaphragm chamber 51 due to the specific manner in which these chambers are connected in the circulating system. The small area of the equalizing line 71 will cause a pressure to be formed in the chamber 53 and a vacuum in the chamber 51 so that the beam 54 is moved upwardly. Upward movement of the beam 54 by the diaphragms 50 and 52 moves the slide rods 58 upwardly and carries the tripping pawl 66 to a position where the notch 99 thereof is raised above the position of the pin 100 on the latch 94. The control device is now set for automatic operation and so long as the circulation pump 9 is operating so as to cause proper circulation of the cooling water, the diaphragms 50 and 52 will hold the tripping pawl 66 in a slightly higher raised position than shown in Figure 6 with the notch 99 above the pin 100. Upon a reduction in pressure in the circulating cooling system, the diaphragms 50 and 52 move downwardly thus moving the tripping pawl 66 downwardly into engagement with the pin 100 as shown in Figure 6. Continued downward movement of the tripping pawl forces the inner end of the latch 94 downwardly and releases the crank pin 86 from the notch 97. This releasing of the crank pin 86 allows for the operating lever 92 to swing downwardly and the crank pins 86 and 86' upwardly for raising the push rods 87. Downward swinging of the operating lever 92 is limited by the springs 89 which also serve to relieve shock between the push rods and the cross beam 72. The cross beam 72 thus being released is urged upwardly by the springs 82 thus closing the valves 14 and 15 shutting off flow of fuel and water to the engine thru the respective valves, and opening the drain valve 16 permitting draining of water from the engine and pump. This opening of the drain valve 16 also permits draining of the diaphragm chambers 51 and 53.

Should the engine speed up for any reason beyond a predetermined operating speed, abnormal forces will be exerted upon the diaphragms 50 and 52 so that the slide rods 58 are raised to an extent whereby the switch arm 105 acts to operate the shut out switch 104 and ground the ignition circuit to the engine. This grounding of the ignition circuit will cause the engine to stop with the result that pressure in the circulating system will be reduced and the control device actuated in the manner previously described for shutting off the fuel and water supply and draining the cooling water from the engine.

Thus it will be seen that the pressure acting upon the diaphragms 50 and 52 does not act directly upon the control valves but merely serves to release the manually operated valve actuating means. This reduces the force required for operating the diaphragms since the diaphragms are not required to move the valve stems 32 and 33 thru their respective stuffing boxes. The valve stems are moved to an open position by manually operable means and moved to a closed position by the closing springs 82. The springs 82 will also cause a quicker closing of the valves 14 and 15 since closing movement of the valves is not limited by any force acting upon the diaphragms.

The control device may also be manually tripped when in a running position by merely raising the outer end of the setting latch 94 to release the crank pin 86 from the notch 97.

Changes in details may be made to the form of invention herein shown and described, without departing from the spirit of the invention or the scope of the following claims.

I claim:

1. In a control device of the class described, a control valve embodying a stem, a cross beam connected to the stem, a diaphragm casing secured above the valve, a diaphragm in the casing, a beam connected to the diaphragm, a slide rod secured to each end of the diaphragm connected beam and slidable in said cross beam, spring means acting upon the cross beam to normally close the valve, manually operable control means for opening the valve and embodying a pair of push rods engageable with the cross beam for urging the cross beam in a direction opening the valve, a latch engageable with the manually operable control means for holding the valve open, and a tripping pawl carried by one of said slide rods for releasing the pawl to permit closing of the control valve by said spring means.

2. In a control device of the class described, a pair of stop valves each embodying a valve disc, a coupling frame connecting the valves in vertically spaced relation, a valve stem connecting the valve discs, a cross bar connected at its central portion to the valve stem, spring means acting upon the cross bar to normally seat the valve discs, a diaphragm casing secured to and above the upper stop valve, a pair of diaphragms in the casing and each providing a diaphragm chamber, a beam connecting the diaphragms, a slide rod secured to each end of the beam and having their lower ends slidable thru the ends of said cross bar, a crank rod journaled at the under side of the diaphragm casing and having a crank pin at each end, an operating lever on one end of the crank rod, a push rod on each crank pin and having their lower ends slidable thru the cross bar, a shoulder on each push rod for engaging the cross bar to force the same downwardly for opening the valve discs, shock absorbing coil springs encircling the push rods beneath the cross bar, a mounting plate carried by the diaphragm casing, a latch pivoted on the mounting plate and having a notch for receiving one of said crank pins for holding the push rods in a lowered position with the valve discs open, and a tripping pawl carried by one of said slide rods for releasing said latch to permit closing of the valve discs and return of the push rods by said operating lever.

3. In a control device of the class described, a pair of similar control valves each having a threaded sleeve portion at the lower side of the valve body and a coupling extension at the upper side of the valve body, an open coupling frame detachably connecting the valves in vertically spaced relation, a diaphragm casing secured to the coupling extension of the upper valve, a drain valve secured to the sleeve portion of the lower valve, means connecting the valves for unitary and like operation of the control valves and opposite operation of the drain valve to that of the control valves, means normally urging the control valves to a closed position and the drain valve to an open position, manually operable means for opening the control valves and closing the drain valve, latch means for the manually operable control means, and diaphragm operated means for releasing the latch to permit closing of the control valves and opening of the drain valve.

4. In a control device of the class described, a control valve, spring means normally urging the valve into a closed position, manually operable control means for opening the valve, latch means engageable by the control means for holding the valve open, a diaphragm casing, a pair of connected diaphragms in the casing and providing superposed pressure and suction chambers, an equalizing line connecting the pressure and suction chambers, a vent small diametered line for the upper chamber, and a pawl pivotally carried by the control means operable by said diaphragms to release said latch means and permit automatic closing of the valve by said spring means.

5. In a control device of the class described, a control valve embodying a stem, a cross beam connected to the stem, a diaphragm casing secured above the valve, a diaphragm in the casing, a slide rod movable by the diaphragm and slidable in the cross beam, spring means acting upon the cross beam to normally close the valve, manually operable control means for opening the valve and embodying a push rod for urging the cross beam in a direction opening the valve, a latch engageable by the control means for holding the valve open, and a tripping pawl carried by the slide rod for releasing the latch to permit closing of the control valve by said spring means.

6. In a control device of the class described, a control valve embodying a valve body and a stem, a cross bar connected at its central portion to the stem, spring means acting upon the cross bar to normally close the valve, a diaphragm casing secured to the valve body, a diaphragm in the casing, a beam connected to the diaphragm, a slide rod secured to each end of the beam and slidably guided in the ends of the cross bar, a crank rod journaled on the diaphragm casing and having a crank pin, an operating lever secured to the crank rod, a push rod pivoted on the crank pin and slidable through the cross bar, means on the push rod and engageable with the cross bar for opening the valve, a pivoted latch engageable by the crank pin for holding the push rod in a position retaining the valve open, and a tripping pawl carried by one of the slide rods for releasing said latch to permit closing of the valve and return of the push rod by said operating lever.

7. In a control device of the class described, a control valve, a diaphragm casing secured above the valve, a diaphragm in the casing, a slide rod secured to and movable with the diaphragm, spring means normally closing the valve, a crank rod journaled at the under side of the diaphragm casing and having a crank pin, a gravity returned operating lever on the crank rod, a push rod pivoted on the crank pin for opening the valve against the tension of said spring means, a bracket secured to the diaphragm casing, a valve setting latch lever pivoted on the bracket and having a notch receiving the crank pin for holding the push rod in its valve opening position, and a tripping pawl pivoted on the slide rod for automatically releasing the latch to permit closing of the valve, said latch lever also being manually releasable to permit closing of the valve.

HORACE L. McQUISTON.